United States Patent [19]

Kaplan

[11] 3,881,044

[45] Apr. 29, 1975

[54] SHADOW MASK FOR USE IN SCREENING A COLOR CATHODE-RAY TUBE

[75] Inventor: Sam H. Kaplan, Chicago, Ill.

[73] Assignee: Zenith Radio Corporation, Chicago, Ill.

[22] Filed: Apr. 9, 1973

[21] Appl. No.: 349,147

Related U.S. Application Data

[62] Division of Ser. No. 191,653, Oct. 22, 1971, Pat. No. 3,736,137.

[52] U.S. Cl. ................ 428/131; 118/504; 118/505; 313/85 S; 29/579; 428/63; 428/156

[51] Int. Cl. .............................................. B44d 1/18

[58] Field of Search ........ 118/504, 505, 49; 29/579; 117/212; 313/85 S

[56] References Cited

UNITED STATES PATENTS 3,707,640 12/1972 Lerner .............................. 313/85 S

*Primary Examiner*—John D. Welsh

*Attorney, Agent, or Firm*—John H. Coult

[57] ABSTRACT

The screen of a color cathode-ray tube is formed by a photographic method in which a photosensitive coating applied to the screen area is exposed through the apertures of a shadow mask. This disclosure places particular emphasis on novel shadow mask constructions which provide for screening of graded size phosphor dots (or black surround grille openings) with a mask having apertures of uniform size, or conversely, uniform size phosphor dots (or black surround grille openings) with a mask having graded size apertures. More particularly, a removable coating is applied around the mask apertures which varies in thickness from the center toward the edges of the mask. After the screening is completed, the coating is removed from the apertures, permitting the mask to be used as the color selection electrode of the tube.

2 Claims, 5 Drawing Figures

SHADOW MASK FOR USE IN SCREENING A COLOR CATHODE-RAY TUBE

CROSS-REFERENCE TO RELATED APPLICATION

This application is a division of my copending application Ser. No. 191,653, filed Oct. 22, 1971, now U.S. Pat. No. 3,736,137, assigned to the assignee of the present invention.

BACKGROUND OF THE INVENTION

Methods for screening a shadow mask type of color cathode-ray tube are now quite well known and generally involve the use of a photosensitive coating to be exposed with the shadow mask in its operative relation relative to the screen to the end that the phosphor dots have the necessary precise position for color selection and color purity in the operation of the tube. The most popular screening technique is one in which the screen is covered with a photosensitive resist having the property that elemental areas which are exposed to actinic energy directed thereto through the apertures of the shadow mask become insoluble in a solvent. Conveniently, sensitized polyvinyl alcohol is used as a resist because it is soluble in water and, consequently, exposing this resist to develop an image of exposed dots permits easy development of that image simply by washing the screen with water. If the resist further includes a phosphor material as an ingredient, such an exposure and developing procedure permits the formation of the green phosphor dots, for example, of the screen. Repeating this same process twice more, suitably adjusting the position of the source of actinic energy on each occasion, results in depositing like dots of blue and red phosphor. Necessarily, the dot patterns are interlaced and collectively they define the now familiar mosaic or triad structure of the color screen.

It has become commonplace to arrange matters such that the phosphor dots of all three colors are of uniform size and larger in diameter than the electron beams which have access to the phosphor dots through the shadow mask. It has further become common practice to provide that the portion of the phosphor dots excited by an impinging electron beam be largest at the center of the screen and decrease in size with radial spacing from the center toward the edge of the screen or image area. This is accomplished by using a shadow mask in which the apertures are similarly graded in diameter with radial spacing from the center. An advantage, of course, is that a brightness increase is realized in the central portion of the screen and an acceptable tolerance for beam registration is made available at the edges of the screen where the possibility of misregistration is most pronounced. Screening with a mask of graded apertures in attempting to form dots of uniform size over the whole screen area has heretofore been difficult because of an undesired dependence of the size of the phosphor dots upon the duration of the exposure step.

Another problem presents itself in constructing the screen for such a tube if it is to feature the so-called "black surround" principle described and claimed in U.S. Pat. No. 3,146,368, issued to Joseph P. Fiore, et al. on Aug. 25, 1964 and assigned to the assignee of the present invention. This technique is one wherein both the brightness and contrast properties of a color tube are materially enhanced by having the phosphor dots smaller than the apertures of the show mask and by surrounding each such dot with light absorbing pigment. The practical difficulty here resides in attaining the desired relative dimensions of the phosphor dots and the apertures of the shadow maks. It has been proposed that the show mask have apertures of uniform diameter, temporarily stepped down by coating or plating with opaque material to the end that smaller diameter holes are available for screening purposes. After the screening, of course, the coating is removed so that the mask as permanently installed in the tube has larger apertures than the phosphor dots. Once again, the screening has been undesirably critical as to exposure time and also it has been a problem, heretofore, to conveniently attain a desired gradation of dots over the screen area in a tube having black surround and a shadow mask with apertures of uniform dimension.

It is a general object of the invention to provide a novel shadow mask useful in forming a screen for a color cathode-ray tube.

It is a particular object of the invention to provide a shadow mask useful in forming a color tube screen which has phosphor elements which are smaller than and which have a different size distribution than the associated apertures in the shadow mask.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

DESCRIPTION OF THE PREFERRED EMBODIMENTS

Figure 1:
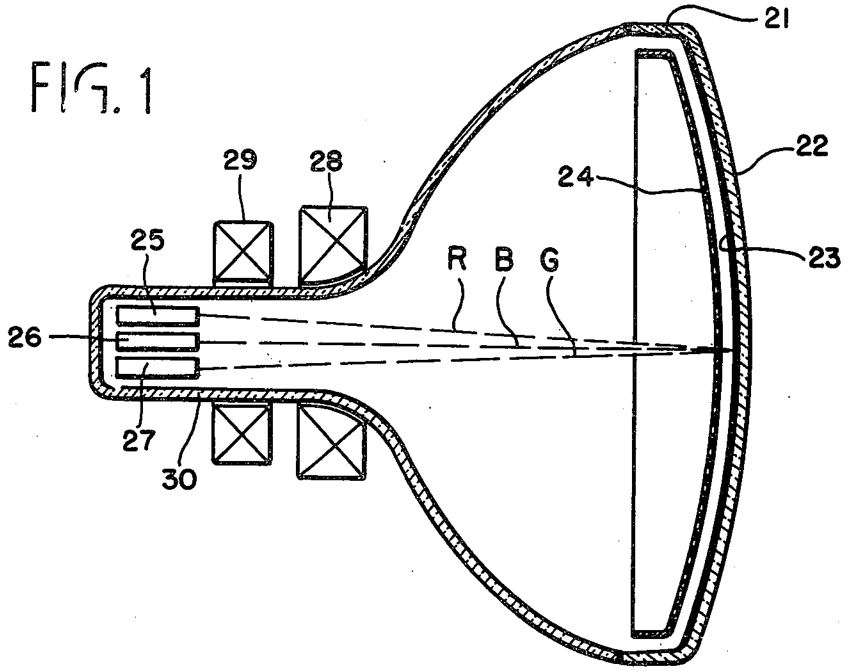
FIG. 1, is a schematic representation, in cross section, of a three-gun shadow mask color television tube screened by a method utilizing a shadow mask embodying the invention.

The type of color television tube under consideration, as shown in FIG. 1, has an envelope 20 which conveniently has a faceplate section 21 dimensioned and configured for frit sealing to the conical section of the remainder of the envelope and the small end of the conical section terminates in the usual reduced diameter neck section. The faceplate section 21 is initially separate from the rest of the envelope which facilitates providing on the inner surface of the faceplate a screen 22 which is backed by a conductive and light reflecting layer 23. Screen 22 is comprised of a repeating series of phosphor triads each of which has a dot of green, a dot of blue and a dot of red phosphor all as well understood in the art and the backing layer 23 is usually formed of aluminum. A color selection electrode 24 or shadow mask is mounted contiguous to and in spaced parallel relation relative to the screen, being retained in position by mounting springs which connect at one end to the mask structure and terminate at the opposite ends in apertures dimensioned to receive support pins which project inwardly of the faceplate section of the tube envelope. This mounting arrangement is well known in the art, and, accordingly, has not been illustrated.

The neck portion of the envelope accommodates an arrangement of three electron guns 25, 26 and 27 which usually are assembled into what is referred to as a gun mount for issuing three electron beams designated R, B and G which are admitted to the screen 22 by the apertures of shadow mask 24. Since this is a parallax type of device, the geometry of the gun mount is such that the beam issuing from any of the three guns is permitted to see and impact upon only those phosphor dots of the color to which that particular beam has been assigned. There is one aperture of the shadow mask for each triad or dot cluster on the screen and the three beams scan the screen through the shadow mask under the influence of deflection fields generated by a deflection yoke 28. It has also been found necessary to provide a convergence field by means of a convergence assembly 29 so that the three beams maintain a desired condition of convergence in the place of the shadow mask as these beams are deflected through the scanning raster.

The structure as thus far described is entirely conventional both as to its makeup and operation so that it is not necessary to consider such matters further and particular attention will be given to changes in the shadow mask and in the methods of screening.

Initial consideration will be given to forming a screen for a black surround tube. There are two approaches available; (1) applying the black surround material first and following this with the application of the interleaved patterns of phosphor dots, or (2) first establishing the interleaved patterns of dots of different phosphor materials followed by the application of black surround material. Both procedures are discussed in U.S. Pat. No. 3,146,368. Another and particularly attractive method of applying the black surround material first is described and claimed in an application of Sam H. Kaplan, Ser. No. 773,830, filed Nov. 6, 1968, now U.S. Pat. No. 3,615,461, issued on Oct. 26, 1971 and assigned to the assignee of the present invention. In view of these disclosures, and especially that of the afore-identified patent, it is not necessary to consider all of the manipulative steps of forming the screen; it is sufficient to consider the apparatus and process changes of the present invention.

Consider initially a previous process, described in U.S. Pat. No. 3,231,380, in which a shadow mask is formed with apertures of essentially uniform diameter which are temporarily stepped down or reduced in size by the application of a removable uniform coating of a metal or an opaque organic material. For example, the mask may be plated with copper or zinc to provide the apertures with a temporary lining or coating that may be finally selectively removed by etching. To form one series of phosphor dots with such a shadow mask, the inner surface of the faceplate is coated with a photosensitive composition including particles of the phosphor material from which the phosphor dots are desired to be formed. The faceplate, having received a uniform coating of the photosensitive material, is exposed to radiation actinic to the coating, such as ultraviolet light, through a shadow mask having coated apertures to establish a latent image of the phosphor dot pattern in the coating. The coating is then developed. As stated above, the elemental areas of the coating that have been exposed become insoluble whereas the unexposed portions retain their solubility in water and, therefore, wash off leaving the exposed phosphor dots.

Figure 3:
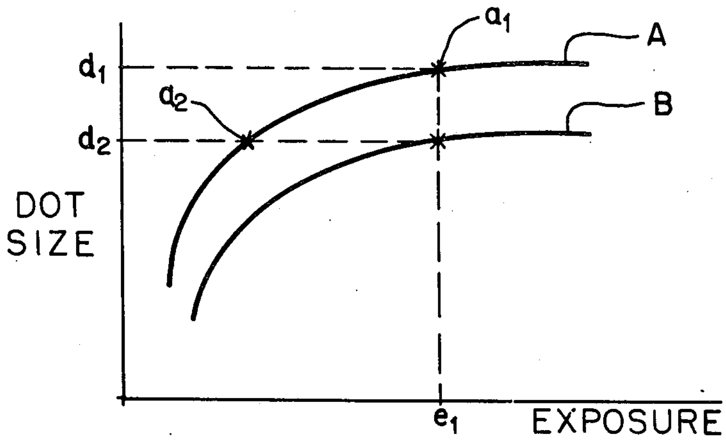
FIG. 3 depicts curves useful in understanding a screening process in which the shadow mask shown in FIGS. 1–2 is employed.

FIG. 3 includes a curve A which shows the dependence of the size or dimension of the phosphor dot with exposure where exposure is the product of the intensity of the ultraviolet light and time or the exposure interval. Curve A assumes exposure through an aperture of fixed dimension and with a light of a given intensity. It is clear from curve A that the dot attains a maximum size after exposure for a certain minimmum time which is apparent from the fact that the curve attains essentially zero slope after exposure $e_1$. In screening as conducted in the past, the point $a_1$ of curve A represents the exposure conditions at the center of the screen resulting in a dot dimension in that portion of the screen of a diameter $d_1$. At the same time, conditions at the edge of the screen are represented at the point $a_2$ of the curve which establishes a smaller dot size $d_2$ at the edges of the screen or image area of the tube. This difference in size is a result of the difference in the intensity of the exposure at these points of the screen (due to their being at different distances from the radiation source) since the duration of exposure is the same for both. Control of the intensity of the exposing light at various points on the screen is made possible by the interposition of a graded light filter between the source and the shadow mask. The filter permits a desired gradation of phosphor dots from a maximum dimension at the center to the minimum dimension at the edges of the screen. But the criticality of screening is apparent in considering the conditions at the point $a_2$. This falls at a steeply sloped part of the curve and, therefore, the dot size is subject to substantial variations with such things as exposure time and intensity, humidity, coating thickness and the like which is undesirable.

Figure 2:
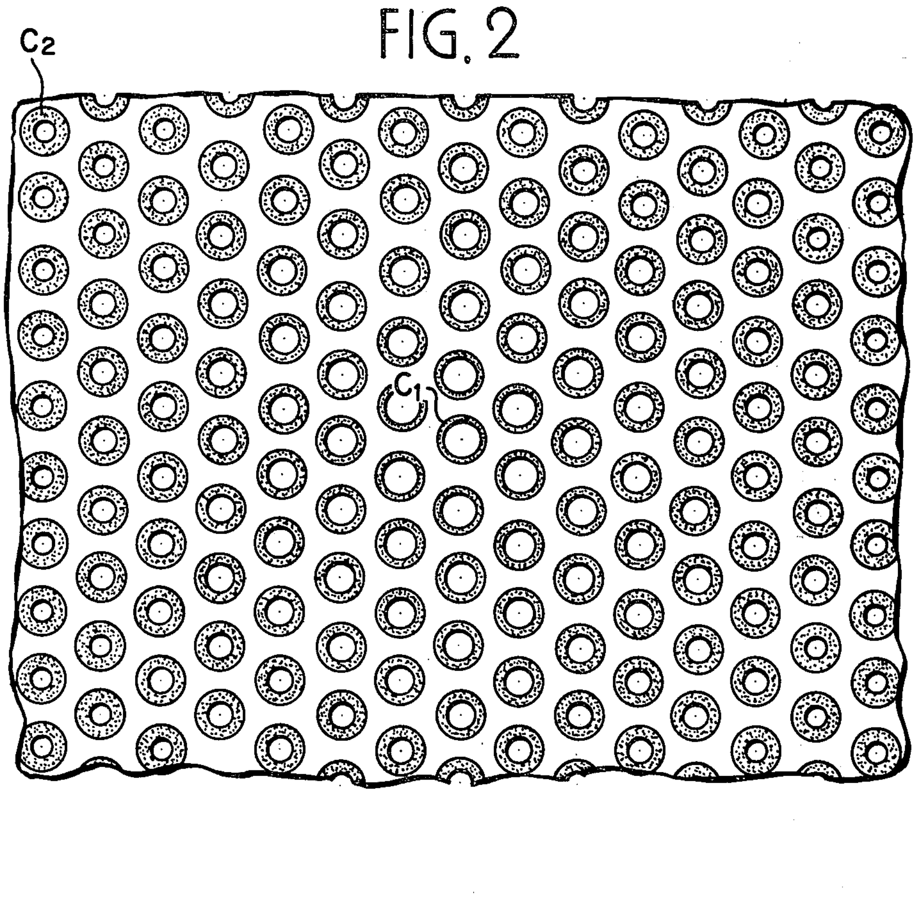
FIG. 2 is a simplified schematic view of the novel shadow mask shown in FIG. 1.

This limitation of prior practices is avoided by the present invention in accordance with which the thickness of the removable coating of the mask apertures is caused to vary with spacing of the apertures from the center to the edges of the aperture pattern. Preferably, and as schematically illustrated in FIG. 2, the coating $c_1$ at the center of the mask is less than the coating $c_2$ spaced from the center. The coating thickness increases progressively with increasing distance from the mask center. For such a coated mask with resulting graded apertures or holes, the screen exposure may be understood by inspecting curve B as well as curve A of FIG. 3. Curve B, while of the same general shape as curve A, is for exposure through apertures at the edge of the mask. The apertures at the edge of the mask are smaller than the apertures at the center of the mask and therefore produce smaller size dots (for otherwise equivalent exposure). In practicing the invention, the thickness variations of the removable coatings of the mask holes is such that exposure through the holes at the center of the mask result in maximum dot size $d_1$ and exposure at the edge of the mask likewise gives maximum but a smaller dot size $d_2$. A family of similar curves, located between curves A and B could be drawn to show the equivalent conditions established at the intermediate apertures between the center and the edges of the mask. The advantage is apparent that the dot size is now essentially independent of exposure time because the exposure interval is at least that which results in maximum dot size and the condition represented at point $a_2$ of curve A no longer prevails. Restated — the desired dot size variation from the center to the edges of the screen is achieved by causing the shadow mask to have a hole size variation corresponding to the desired dot size variation and overexposing the complete area of the photosensitive coating. Thus the prior art reliance on intensity fall-off characteristic of the irradiation energy from the center to the edges of the screen is avoided.

A 23-inch 90° shadow mask tube may be processed, in accordance with the invention, with an aperture mask having holes with a uniform diameter of about 16 mils. Such a mask is differentially coated to change the effective hole diameter from a value of 10.5 mils at the center decreasing progressively to about 7.5 mils at the edges. If the faceplate is coated with the conventional sensitized pva slurry of uniform thickness and the exposure interval is sufficient that dot sizes of maximum dimension are attained, as described above, there will result a desired condition of graded dots varying in dimension from approximately 13 mils at the center to 10 mils at the edge of the screen. After the screening has been completed, including the usual filming and aluminizing, the removable coating is eliminated to restore the mask to its original condition in which it exhibits holes of uniform diameter. The tube now has maximum brightness at the center because of a larger dot size at that portion of the screen and also has desirable tolerance with respect to beam landings at the edge of the screen because of the reduced dot size at that portion of the screen.

It is not especially difficult to differentially coat the apertures of a shadow mask. Generally, plating is performed by immersing the mask in a suitable coating bath, using the mask as one electrode and having a cooperating and generally similarly shaped electrode in spaced relation with respect to the mask. If the other electrode is shaped so that its spacing from the mask is a minimum at the edges and a maximum at the center, the desired differential coating will result. In particular, the coating will be thicker at the edges and progressively thinner at apertures displaced radially inwardly toward the center of the mask.

Another advantage of the described process for the black surround type of screen is that it also grades the dots as explained, with the larger dots at the center for increased brightness.

Figure 5:
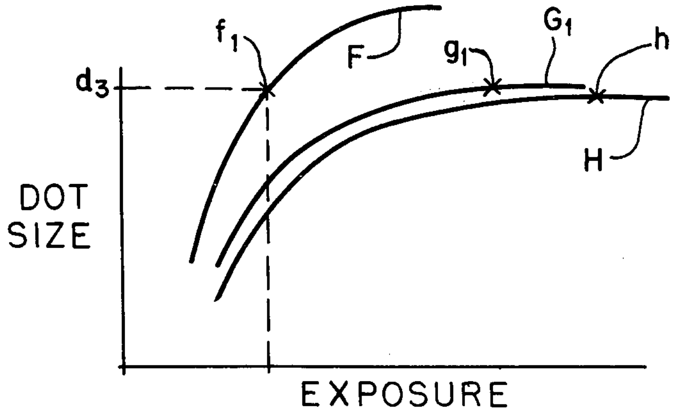
FIG. 5 depicts curves useful in understanding a screening process in which the mask of FIG. 4 is employed.

The advantage of the described process in having the dot size less critically dependent on exposure conditions is also applicable to color tubes that do not employ black surround. Such a tube, as currently fabricated, uses a shadow mask in which the holes are graded, progressively decreasing in diameter from approximately 12 mils at the center to about 9½ mils at the edges. When employing such a mask in photographic type of screening, the exposure conditions are similar to those represented by curves F and G of FIG. 5. Curve F depicts conditions at the center of the screen where the exposure is through the largest holes of the mask and curve G represents the other extreme, namely, conditions at the edge where the exposure is through holes of the mask having the smallest diameter. The operating points designated $f_1$ and $g_1$ are chosen to the end that the phosphor dots have essentially the same diameter over the screen. But here again, the operating point $f_1$ is clearly undesirably subject to variations in the parameters of the screening and exposure.

Figure 4:
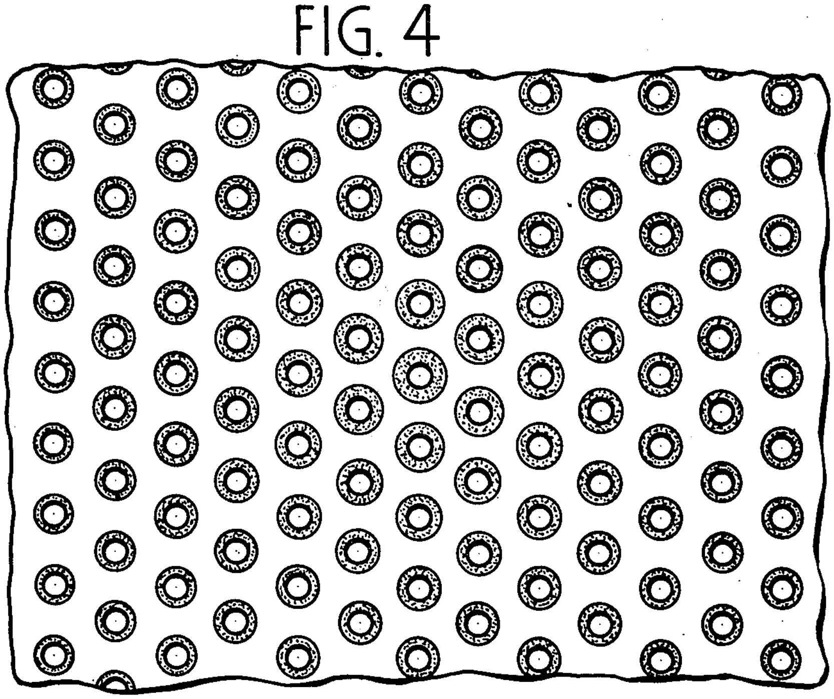
FIG. 4 is a schematic view of another form of shadow mask in accordance with the invention.

The modified mask shown in schematic form in FIG. 4 overcomes this difficulty through the technique of differential coating. In this case, the coating thickness increases from the edge of the pattern of apertures in the mask toward the center and at such a rate that the coated mask has holes of essentially uniform diameter since essentially uniform diameter dots are now required. The appropriate relation of dot size to exposure for the coated mask, for which the holes are not only uniform but are slightly smaller than the minimum dimension of the apertures in the graded mask, is that of curve H and now the operating point is designated h. Operating at that point provides the same size phosphor dots as obtained from the aforedescribed operation of the points $f_1$ and $g_1$ but now the dot size is much less dependent on precision of the exposure conditions since the point $h$ is on the flat part of the characteristic curve H.

In coating the graded screen, in the manner represented in FIG. 4, the coating thickness may be chosen to establish an overall hole diameter of about 9 mils and the exposure time and intensity may be adjusted to achieve the desired dot size $d_3$ of approximately 17 mils.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An aperture mask useful in the screening of a color cathode-ray tube, comprising a color selection electrode having a pattern of apertures of predetermined individual size and further having a removable, optically opaque coating around the periphery of each of said apertures which varies in thickness between the center and edges of said aperture pattern and which acts to modify the diameter dimension of said apertures such that aperture diameter decreases with increasing coating thickness.

2. An aperture mask in accordance with claim 1 wherein said apertures uncoated have substantially uniform size and wherein the thickness of said coating around said apertures increases from the center to the edges of said aperture pattern in accordance with a predetermined size grading function.

* * * * *